United States Patent
Klein et al.

[15] 3,689,131
[45] Sept. 5, 1972

[54] LIQUID CRYSTAL DISPLAY DEVICE

[72] Inventors: Richard I. Klein, Edison; Sandor Caplan, Trenton; Ralph T. Hansen, Murray Hill, all of N.J.

[73] Assignee: RCA Corporation

[22] Filed: June 29, 1970

[21] Appl. No.: 50,788

[52] U.S. Cl.....................................350/160, 340/324
[51] Int. Cl..............................G02f 1/34, G08b 23/00
[58] Field of Search.........350/160; 340/324; 40/52, 106.51, 40/106.52

[56] References Cited

UNITED STATES PATENTS

| | | | |
|---|---|---|---|
| 3,576,364 | 4/1971 | Zanoni | 340/324 |
| 3,499,112 | 3/1970 | Heilmeier | 350/160 |
| 636,721 | 11/1899 | Gilman | 40/52 |

*Primary Examiner*—Ronald L. Wibert
*Assistant Examiner*—V. P. McGraw
*Attorney*—Glenn H. Bruestle

[57] ABSTRACT

A liquid crystal cell comprises a pair of oppositely disposed substrates and electrode connectors extending to an exposed edge of one of the substrates. A printed circuit board having elongated arms is registered with the exposed edge of the substrate, conductive strips of the board being electrically connected to ends of the electrode connectors and extending to a commutator portion of the board. The cell and board are mounted on a frame which disposes the board commutator in registry with and against a programmer rotating cylinder, whereby voltages are sequentially applied to the cell electrodes.

3 Claims, 3 Drawing Figures

INVENTORS.
SANDOR CAPLAN,
RICHARD I. KLEIN and
RALPH T. HANSEN.
BY M.Y. Epstein
ATTORNEY

PATENTED SEP 5 1972 3,689,131

*INVENTORS.*
SANDOR CAPLAN,
RICHARD I. KLEIN, and
RALPH T. HANSEN.
BY M.Y. Epstein
*ATTORNEY*

LIQUID CRYSTAL DISPLAY DEVICE

BACKGROUND OF THE INVENTION

This invention relates to liquid crystal display devices.

One form of liquid crystal device comprises a pair of spaced apart substrates sandwiching a film of liquid crystal material therebetween. Electrodes are provided on the inside surfaces of the substrates, whereby an electric field can be applied through the liquid crystal film. With no applied field, the liquid crystal film is substantially transparent to light. With a field applied through the film, the film becomes forward scattering of light.

By patterning the electrodes on one or both substrates into various electrode segments, and sequentially applying voltages to various ones of the electrode segments, a sequence of different images, i.e., an animated display, can be provided.

A need exists for a simple and inexpensive means for mounting and programming such liquid crystal devices.

DESCRIPTION OF A PREFERRED EMBODIMENT OF THE INVENTION

Figure 1:
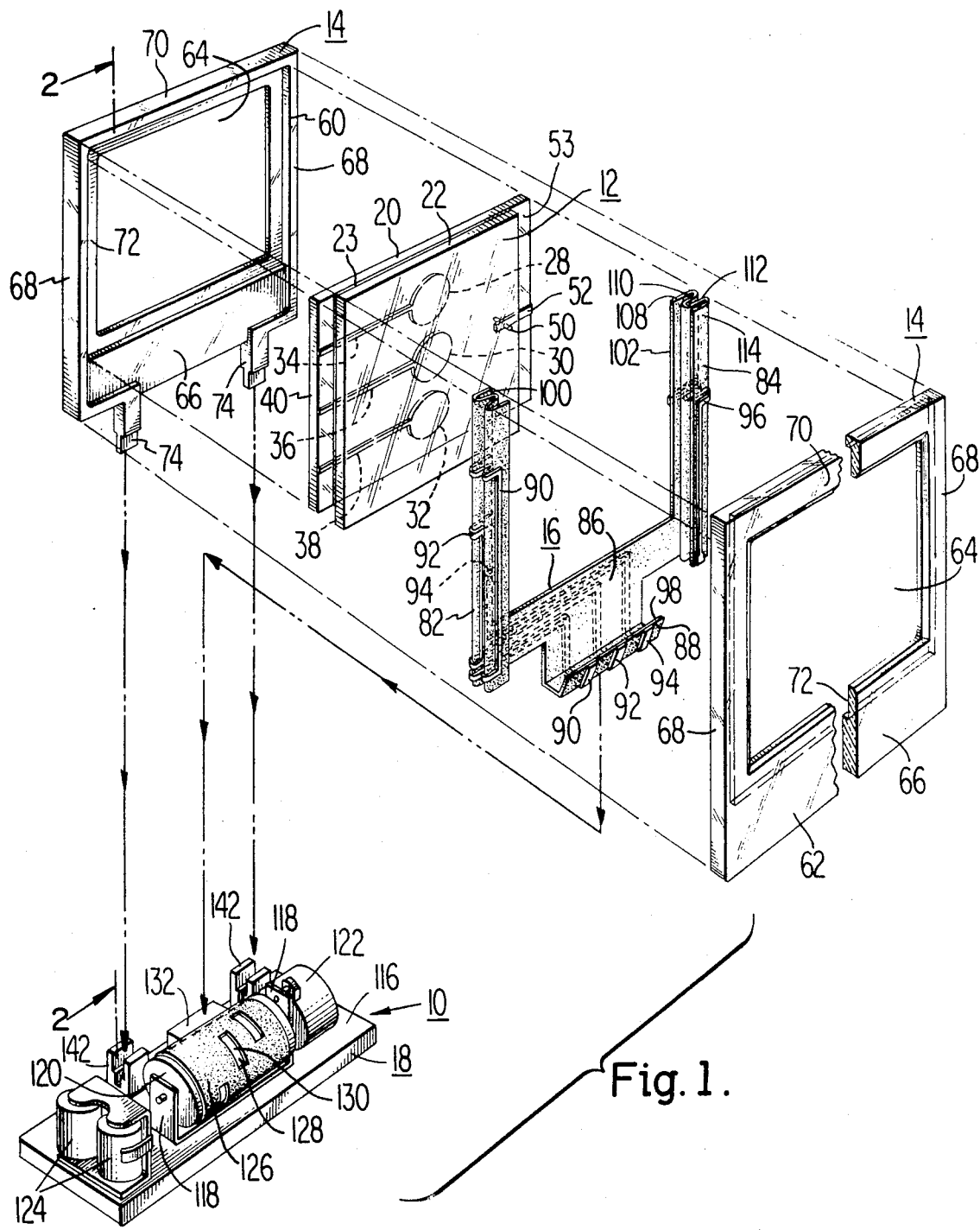
FIG. 1 is an exploded view, in perspective and partly broken away, of a device in accordance with the instant invention.

With reference to FIG. 1, a liquid crystal animated display device 10 is shown. In general, the device 10 comprises a liquid crystal cell 12, a frame 14 within which the cell 12 is mounted, a printed circuit board connector assembly 16 for making electrical connections to the various electrodes on the cell 12, and a programmer assembly 18 for applying voltages to the electrodes of the liquid crystal cell 12 via the connector assembly 16.

The liquid crystal cell 12 can be one of various types, such as certain one of the devices shown in U.S. Pat. Nos. 3,322,485, issued to R. Williams on May 30, 1967, and 3,499,112, issued to G. H. Heilmier et al. on Mar. 3, 1970.

In the instant embodiment, the cell 12 comprises a pair of oppositely disposed transparent front and rear glass substrates 20 and 22, respectively, sandwiching a film 24 (FIG. 2) of a liquid crystal material therebetween. The substrates 20 and 22 are spaced apart a small distance, e.g., 0.005 inch, by means of a spacer 23 of, e.g., a plastic material, disposed between the substrates at the outer portions thereof. The inside surface 26 of the front substrate 20 is provided with three vertically aligned electrodes 28, 30, and 32, each electrode having a circular shape (FIG. 1) and each electrode including a connector 34, 36, and 38, respectively, extending to an edge portion 40 of the front substrate 20. As shown in FIG. 1, the edge portion 40 of the front substrate 20 extends beyond the edge of the rear substrate 22, whereby the ends of the connectors 34, 36, and 38 on the edge portion 40 are exposed.

The inside surface 42 (FIG. 2) of the rear substrate 22 is provided with a single continuous electrode 44. To provide means whereby an electrical connection can be made to the electrode 44, a conductive pin 50 is provided extending between the spaced apart substrates 20 and 22 electrically connecting the electrode 44 on the substrate 22 to a connector 52 on the substrate 20. The connector 52 extends to an edge portion 53 of the substrate 20 extending beyond the substrate 2, whereby the end of the connector 52 is exposed.

The various electrodes and the connectors therefor are of a transparent conductive material, e.g., tin oxide.

When a voltage is applied between the electrode 44 and one or more of the electrodes 28, 30, and 32, as described hereinafter, the portions of the liquid crystal film 24 between the energized electrodes are switched to the light scattering made. All other portions of the film 24 remain transparent. Thus, using a light source 54 above and behind the device, with the light rays from the source directed downwardly through the device and away from a viewer 56 in front of the device, the light passing through the portions of the film 24 in the light scattering mode is scattered in directions including directions towards the viewer. Thus, luminous images, corresponding in shape to the shape of the various ones of the energized electrodes 28, 30, and 32, become visible to the viewer.

The frame 14 comprises a pair of flat members 60 and 62 which cooperate with one another to sandwich therebetween the liquid crystal cell 12 and portions of the connector assembly 16. More specifically, each member 60 and 62 has an opening 64 therethrough defined by a base portion 66, two side portions 68, and a top portion 70, each of the various portions having a recessed ledge 72 around the opening 64 providing a seat for receipt of the liquid crystal cell 12 and portions of the connector assembly 16. Additionally, the base portion 66 of the member 60 includes two dependent mounting tabs 74 by means of which the frame 14 is supported on the programmer assembly 18, as described hereinafter.

The two frame members 60 and 62 are locked together by means of screws, not shown.

The printed connector assembly 16 is formed of a sheet of a stiff but flexible and resilient insulating material, e.g., a known plastic polymer, such as "-Mylar" or "Kapton" (trade names of the E. I. du Pont de Nemours Company), the sheet having a thickness in the order of 3 mils. The connector assembly 16 has a generally U-shape, including a pair of elongated return bent arms 82 and 84, and an arm connector 86 including a dependent flap 88. Disposed on one surface of the sheet are a plurality of spaced conductive strips 90, 92, 94, and 96, e.g., of copper, each strip extending from between a different preselected position along edge 98 of the flap 88 to a different preselected position along an edge 100 or 102 of the two arms 82 and 84, respectively. Along the arm edges 100 and 102, the ends of the strips 90, 92, 94, and 96 are so disposed as to register with individual ones of the exposed ends of the connectors 34, 36, 38, and 52, respectively, of the liquid crystal cell 12 when the device 10 is assembled. An electrically conductive cement, such as a silver epoxy, is used to bond the ends of the various strips 90, 92, 94, and 96 to the corresponding registered exposed ends of the connectors 34, 36, 38, and 52.

As shown in FIG. 1, each arm 82 and 84 is return bent to provide four longitudinally extending flaps 108, 110, 112, and 114. Each of the portions of the conductive strips 90, 92, and 94 which extend longitudinally along the arm 82 is disposed along a different flap.

An advantage of the return bent configuration of the arms 82 and 84 is that a large area of the arms is provided, while not requiring a large width of the frame side portions 68 to receive the arms 82 and 84. This is desirable for reasons of device appearance. A large arm width area is especially desired in embodiments, not illustrated, significantly more complex, with respect to the images displayed, than the embodiment illustrated herein, which have many electrodes requiring many connector strips. In such embodiments, the large arm areas are desirable to prevent excessive crowding of the various strips and possible shorting thereof. With a large number of strips, substantially covering the entire width of the arms, folding of the arms can cause contact between oppositely disposed strips on adjacent, face-to-face flaps. To prevent shorting together of these strips, the surfaces of the strips are coated with an insulating material, e.g., shellac or a plastic material.

In another embodiment, not shown, the arms are not return bent into flaps but into elongated cylinders.

The programmer assembly 18 comprises a base plate 116, serving as the support plate for the entire device 10, a pair of vertical brackets 118 mounted on the plate 116, and a cylinder 120 mounted for rotation about the axis thereof between the brackets 118. A motor 122 is mounted on the plate 116 to rotate the cylinder 120, and batteries 124 are provided to drive the motor.

The wall of the cylinder 120 is made of an electrical conductive material, e.g., copper, covered by a layer 126 of insulating material, e.g., "Mylar". Openings 128 are provided through the insulating layer 126 exposing three narrow strips 130 of the conductive material of the cylinder wall, each strip 130 having parallel side edges, and each strip being parallel to a plane perpendicular to the cylinder axis.

A battery 132, of a voltage suitable to activate the liquid crystal film 24, is mounted on the plate 116, one terminal of the battery 132 being connected to the conductive material of the cylinder wall via a commutator, not shown, and the other terminal of the battery being connected to the strip 96 on the connector assembly arm 84 by a means of a wire, not shown.

Figure 2:
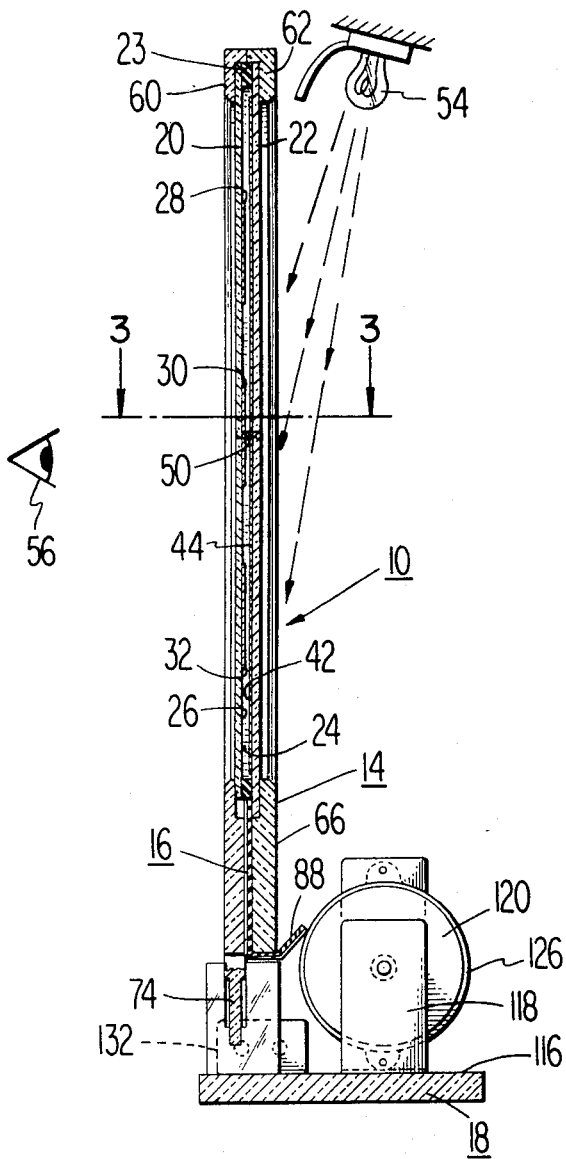
FIG. 2 is a side view of the device shown in FIG. 1, a section of the device taken generally in the direction of the arrows 2 of FIG. 1 being shown.

As shown in FIG. 2, the cylinder 120 is disposed adjacent to the parallel to the base portion 66 of the frame 14. The flap 88 of the connector assembly 16 is bent to extend around the bottom edge of the base portion 66 and upwardly between the frame 14 and the cylinder 120. Owing to the resiliency of the material of the connector assembly 16, the flap 88 is maintained pressed against the wall of the cylinder 120.

Each of the ends of the various strips 90, 92, and 94 (FIG. 1) on the connector assembly flap 88 is aligned with a different one of the cylinder 120 conductive strips 130, whereby, as the cylinder rotates, electrical contact is established between each of the connector strip ends and corresponding ones of the cylinder strips, i.e., the flap 88 serves as a commutator. By selection of the location of the cylinder strips 130 relative to one another, the battery 132 voltage can be applied to the various electrodes on the liquid crystal cell in any desired sequence.

Figure 3:
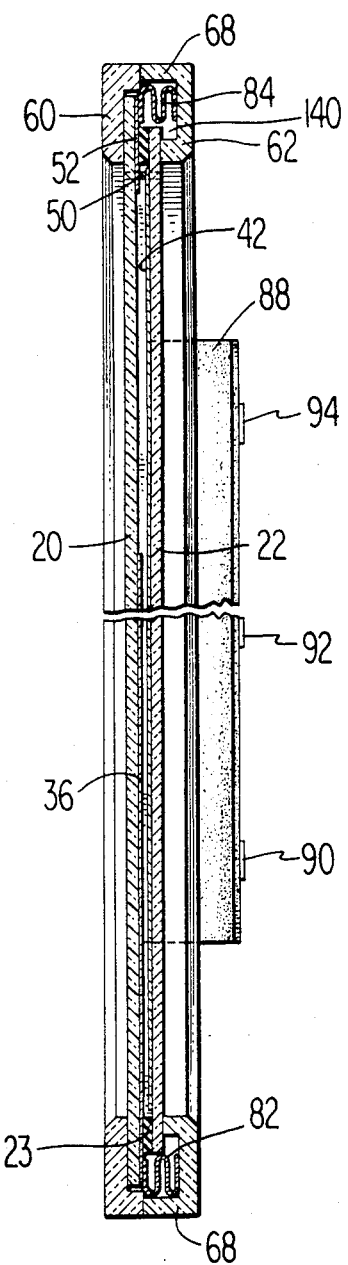
FIG. 3 is a sectional view taken along line 3—3 of FIG. 2.

In assembly of the device 10, the liquid crystal cell 12 is first provided by known means. The connector assembly 16 is then aligned with the liquid crystal cell 12 and the ends of the connector strips 90, 92, 94, and 96 are bonded to the exposed ends of the connectors 34, 36, 38, and 52, respectively, on the substrate 20 of the liquid crystal cell. Then the liquid crystal cell 12 and the arms 82 and 84 of the connector assembly 16 attached thereto are disposed within the seat formed by the two frame members 60 and 62, and the frame members are locked together. As shown in FIG. 3, slots 140 are provided in the inside surface of the side portions 68 of the frame member 62 to receive the folded arms 82 and 84. The frame sub-assembly is then mounted on the programmer assembly 18 by force fitting the two dependent tabs 74 on the frame member 60 into brackets 142 on the base plate 116 of the programmer assembly. This automatically disposes the flap 88 of the connector assembly 16 in proper tensioned registry against the cylinder 120 of the programmer assembly.

We claim:

1. A liquid crystal device for displaying animated images comprising:

a liquid crystal cell including a pair of substrates and a plurality of electrode connectors disposed along a portion of one of said substrates, a connector assembly comprising a sheet of insulating material and a plurality of conductive strips on a surface thereof, said assembly comprising a commutator portion and an elongated arm portion, each of said strips extending from a different point on said commutator portion to a different point on said arm portion, means for maintaining said arm portion disposed along said one substrate portion with each of said strips being electrically connected to a different one of said connectors, said maintaining means comprising a frame having elongated side portions providing a seat for receipt of said cell and said connector assembly arm portion, said arm portion being return bent about the longitudinal axis thereof for reducing the arm portion width, and means for sequentially connecting said strips on said commutator portion to a source of voltage.

2. A device as in claim 1 wherein:

said frame comprises a base portion connecting said side portions, and said voltage connecting means comprises a rotatable member disposed adjacent to said frame base portion, said connector assembly sheet being of a resilient, flexible material, and said connector assembly commutator portion being bent around said base portion extending between said base portion and said rotatable member and being pressed thereagainst owing to the resiliency of said sheet.

3. A liquid crystal device for displaying animated images comprising:

a liquid crystal cell comprising a pair of oppositely disposed substrates sandwiching a liquid crystal material therebetween, electrodes on said substrates, and a plurality of electrode connectors on said substrates extending from said electrodes to an exposed edge portion of one of said substrates, a frame member for supporting said liquid crystal cell comprising a pair of leg portions and a base portion connecting said leg portions, said leg portions containing elongated passageways for receiving edge portions of said substrates including said exposed edge portion, a printed circuit board comprising a resilient sheet of insulating material and a plurality of conductive strips on a surface thereof, said board having a generally U-shape including a pair of extending arms and an arm connecting member, each of said strips extending from a different point along an edge of said connecting member to a different point along an edge of one of said arms, each of said arms being return bent about the longitudinal axis thereof to reduce the width of said arms, and each of said arms being disposed within a different one of said frame leg portion passageways with a terminus of each of said strips being electrcially connected to a different terminus of each of said connectors, a portion of said arm connecting member being folded around said frame base portion, and a programmer including a rotating member having a plurality of conductive areas thereon disposed adjacent to said frame base portion, said circuit board connecting member being disposed between said frame and said rotating member and being resiliently pressed against said rotating member for sequentially connecting various ones of said strips to various ones of said conductive areas upon rotation of said rotating member.

* * * * *